United States Patent [19]

Ishii et al.

[11] Patent Number: 5,942,325

[45] Date of Patent: *Aug. 24, 1999

[54] ELECTROSTATIC RECORDING MATERIALS

[75] Inventors: Masaru Ishii, Kasukabe; Takehiro Sasaki, Ómiya; Takayuki Nemoto, Urawa, all of Japan

[73] Assignee: Kimoto Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/603,325

[22] Filed: Feb. 20, 1996

[30] Foreign Application Priority Data

Feb. 20, 1995 [JP] Japan ........................................ 7-55072

[51] Int. Cl.$^6$ ........................................................ B32B 5/16
[52] U.S. Cl. .......................... 428/331; 428/328; 428/330; 428/446; 430/48
[58] Field of Search ................................. 430/48, 66, 67, 430/70, 84, 87, 90, 96; 428/331, 328, 330, 446

[56] References Cited

U.S. PATENT DOCUMENTS 4,931,359 6/1990 Yagi et al. .............................. 428/325

FOREIGN PATENT DOCUMENTS 2-250059 10/1990 Japan .

*Primary Examiner*—Marion McCamish
*Assistant Examiner*—Cheryl Juska
*Attorney, Agent, or Firm*—Lorusso & Loud

[57] ABSTRACT

An electrostatic recording material includes a conductive layer and a dielectric layer successively superimposed on a support. The dielectric layer contains an insulating resin and a pigment composition. The pigment composition includes silicon dioxide and a pigment component having a Mohs' scale hardness of 3.5 or less. This material simultaneously solves the prior art problems of "dropouts" and "flares" and improves the density of the printed areas.

13 Claims, No Drawings

ELECTROSTATIC RECORDING MATERIALS

BACKGROUND OF THE INVENTION

The present invention relates to electrostatic recording materials, which can be used for, for example, electrostatic plotters.

With the recent increase in use of computer aided design and the like, electrostatic plotters have come to be used in various applications such as the printing of drawings since they can output large format drawings at a high speed. Known electrostatic recording materials used in such electrostatic plotters typically have a conductive layer and a dielectric layer superimposed, in this order, on a support.

In electrostatic recording, a recording voltage is applied to a multi-stylus electrode to generate a gaseous discharge across a small gap between the multi-stylus electrode and a dielectric layer of the electrostatic recording material so that latent images can be formed on the surface of the dielectric layer, which latent images are subsequently developed with toner to produce visible images. Therefore, a small gap between a multi-stylus electrode and a dielectric layer is indispensable. Such a small gap is generally provided by introducing a pigment into the dielectric layer.

As the printing speed of electrostatic plotters has been increased and/or their resolution enhanced, printing defects such as "dropouts", which refers to omission of fine lines and small dots of printed areas, and "flares", which refers to generation of dots having a diameter three or five times larger than that of normal dots, have become more serious problems. Though various proposals have been made to eliminate these printing defects, conventional electrostatic recording materials are incapable of simultaneously solving the problems of "dropouts" and "flares" and hence are not fully satisfactory.

To solve the problem of "dropouts", it has been proposed to use a pigment with a Mohs' scale hardness of less than 5 in combination with a specific amount of another pigment with a Mohs' scale hardness of 5 or more (Japanese Patent Application Laid-open No. 2-250059). This technique may reduce "dropouts", but it cannot prevent the generation of "flares".

On the other hand, to solve the problem of "flares", it has been proposed to use a pigment with a Mohs' scale hardness of 3 or less and which has been subjected to a special surface treatment (Japanese Patent Application Laid-open No. 5-165226). This technique may reduce "flares", but it cannot prevent the generation of "dropouts".

Based on the foregoing prior art teachings, it had been expected that a pigment having a Mohs' scale hardness of 3 or less, subjected to a special surface treatment and combined with a proper amount of a pigment having a Mohs' scale hardness of 5 or more, might alleviate the both problems. However, contrary to that expectation, such a pigment tended to enhance the "dropouts" and the "flares" and proved to be impractical.

Therefore, the object of the present invention is to provide an electrostatic recording material which can simultaneously solve the problems of "dropouts" and "flares" and can output drawings with printed areas having a high density.

SUMMARY OF THE INVENTION

The present invention provides an electrostatic recording material comprising a conductive layer and a dielectric layer containing an insulating resin and a pigment composition provided in that order on a support, wherein the pigment composition comprises silicon dioxide and a pigment component having a Mohs' scale hardness of 3.5 or less.

In a preferred embodiment of the present invention, the weight ratio of silicon dioxide to the pigment component having a Mohs' scale hardness of 3.5 or less is within the range of 0.5:9.5 to 7.0:3.0.

DESCRIPTION OF THE PREFERRED EMBODIMENTS

The support may be composed of any material known to be useful for electrostatic recording materials. Examples of such materials include various kinds of paper such as wood free paper, white roll paper, machine glazed paper, glassine paper, transparent paper, plastic sheets or synthetic paper of, for example, polyester, polycarbonate, polyvinyl chloride, polyethylene, polypropylene and polystyrene. For applications requiring transparency, plastic sheets are preferably used.

Though the conductive layer may be a chemically depositted metal or metal compound membrane, it is normally formed by applying a conductive agent as is or a synthetic resin containing a conductive agent.

The conductive agent may be selected from those conventionally used in electrostatic recording materials. Examples of suitable conductive agents are cationic polymer electrolytes such as polyvinylbenzyltrimethyl ammonium chlorides, polyallyltrimethylammonium chlorides and styreneacrylate triethylammonium chlorides and anionic polymer electrolytes such as polystyrenesulphonates, polyacrylates and polyvinyl phosphates. In addition, electroconductive fine powders composed of zinc oxide, tin oxide, indium oxide and the like doped with antimony oxide, ammonium oxide, tin oxide etc. may also be used as the conductive agent.

The synthetic resin used for the conductive layer may be any resin conventionally used for conductive layers in conventional electrostatic recording materials. For example, it may be selected from polyesters, polyvinyl chlorides, polyacrylic acid esters, polymethacrylic acid esters, polyamides and the like.

The dielectric layer comprises an insulating resin and a pigment.

The insulating resin may be selected from those conventionally used in electrostatic recording materials, and may be selected from, for example, homopolymers and copolymers of acrylic acid esters such as methyl acrylate, ethyl acrylate, 2-ethylhexyl acrylate and decyl acrylate, homopolymers and copolymers of methacrylic acid esters such as ethyl methacrylate, isobutyl methacrylate and 2-ethylhexyl methacrylate, polyvinyl acetates, ethylene/polyvinyl acetate copolymers, butyral resins, polyesters, nitrocelluloses, polystyrenes, styrene/acrylic acid or acrylate copolymers, styrene/methacrylic acid or methacrylate copolymers, phenol resins and the like.

The pigment composition contained in the dielectric layer includes, in combination, at least silicon dioxide and a pigment with a Mohs' scale hardness of 3.5 or less.

Average diameter of the silicon dioxide used in the present invention is normally within a range of about 1 to about 20 $\mu$m, preferably about 2 to about 8 $\mu$m. When the average diameter is too large, it becomes likely that dropouts will be observed. On the other hand, when the average diameter is too small, it becomes likely that flares will be generated. Silicon dioxide having an average diameter within the above-specified range may be produced in a known manner and is commercially available.

As the pigment having a Mohs' scale hardness of 3.5 or less, there can be mentioned those composed of aluminium hydroxide, talc, clay, kaolin, calcium carbonate, aluminium silicate, magnesium hydroxide and the like and any of these may be advantageously used in the present invention. Pigments having such a hardness and composed of materials mentioned above may be produced in a known manner and are commercially available. These pigments may be used alone or in any combination thereof and generally have a Mohs' scale hardness of 1.0 to 3.5. However, pigments having a Mohs' scale hardness less than 1.0, for example, 0.5, may also be used for the present invention.

Combinations of silicon dioxide and the pigment having a Mohs' scale hardness of 3.5 or less can, not only extremely reduce generation of "dropouts" and "flares", but also improve density of the printed areas. Average diameter of the pigment having a Mohs' scale hardness of 3.5 or less is normally within a range of about 1 to about 20 $\mu$m, preferably about 2 to about 8 $\mu$m. When the average diameter is too large, the gap between the surface of recording material and the multi-stylus electrode becomes too large and hence it becomes difficult to generate a desirable gaseous discharge. On the other hand, when the average diameter is too small, the gap becomes too small and it may reduce uniformity of outputted images.

The silicon dioxide and the pigment component having a Mohs' scale hardness of 3.5 or less are preferably used in a weight ratio of 0.5:9.5 to 7.0:3.0, more preferably 1.0:9.0 to 4.0:6.0. As the amount of silicon dioxide is increased exceeding this range, dropouts become more and more enhanced. On the other hand, if the amount of silicon dioxide is lower than the above-specified range, the number of flares increases as the amount of silicon dioxide is reduced. In addition, an extremely high density of printed areas can be obtained by an amount of silicon dioxide within the above range, but if the amount is outside the above range, the density of the printed areas is decreased regardless of whether the amount is lower or larger than the range.

In the dielectric layer, the pigments are used in a total amount of 3 to 40% by weight, preferably 5 to 30% by weight based on the weight of the insulating resin. When the amount is lower than 3% by weight, uniformity of printed solid portions suffers. On the other hand when the amount exceeds 40% by weight, the density of image areas decreases.

The conductive layer and the dielectric layer may contain other pigments, plasticizers, antioxidants stabilizers and the like, if necessary.

The conductive layer and the dielectric layer may be formed by applying a coating solution comprising the resins, the pigments and the like mentioned above, dissolved or dispersed in a solvent, onto a support using an appropriate coating device such as a bar coater, gravure coater, curtain coater, roll coater or blade coater.

According to the present invention, because the dielectric layer contains silicon dioxide and a pigment having a Mohs' scale hardness of 3.5 or less, both "dropouts" and "flares" are markedly reduced and the density of the printed areas is improved.

EXAMPLES

The present invention will be illustrated by the following working examples. The terms "part" and "ratio" mean "part by weight" and "weight ratio", respectively, unless otherwise indicated.

Example 1

An electrostatic recording material was produced by applying and drying solutions having the following compositions to form a conductive layer and a dielectric layer in succession on one surface of a polyester film having a thickness of 100 $\mu$m. The conductive layer and the dielectric layer, respectively, had dry thicknesses of 1.5 $\mu$m and 5.0 $\mu$m.

<Composition for conductive layer>

| | |
|---|---:|
| Polyester resin | 2.5 parts |
| (VYRON 200, Toyobo Co., Ltd.) | |
| Electro-conductive tin oxide | 7.5 parts |
| (ELECOM TL-30, Catalysts & | |
| Chemicals Industries Co., Ltd.) | |
| Methyl ethyl ketone | 45.0 parts |
| Toluene | 45.0 parts |

<Composition for dielectric layer>

| | |
|---|---:|
| Butyral resin | 30.0 parts |
| (DENKA BUTYRAL #2000, Denki Kagaku Kogyo K.K.) | |
| Silicon dioxide | 1.50 parts |
| (average diameter: 4 $\mu$m, SYLYSIA 435, a silica gel manufactured by Fuji Silysia Chemical Co., Ltd.) | |
| Aluminium hydroxide | 3.00 parts |
| (average diameter: 6 $\mu$m, HIGILITE H-31 Showa Keikinzoku Co., Ltd.) | |
| Methanol-denatured ethanol | 195.0 parts |
| n-Butanol | 75.0 parts |
| (ratio of silicon dioxide/pigment having a Mohs' scale hardness of 3.5 or less was 3.3:6.7) | |

Example 2

An electrostatic recording material was produced in the same manner as in Example 1 except that the solution used for forming the dielectric layer had the following composition:

<Composition for dielectric layer>

| | |
|---|---:|
| Butyral resin | 30.0 parts |
| (DENKA BUTYRAL #2000, Denki Kagaku Kogyo K.K.) | |
| Silicon dioxide | 0.69 parts |
| (average diameter: 4 $\mu$m, SYLYSIA 435, a silica gel manufactured by Fuji Silysia Chemical Co., Ltd.) | |
| Aluminium hydroxide | 6.21 parts |
| (average diameter: 6 $\mu$m, HIGILITE H-31 Showa Keikinzoku Co., Ltd.) | |
| Methanol-denatured ethanol | 195.0 parts |
| n-Butanol | 75.0 parts |
| (ratio of silicon dioxide/pigment having a Mohs' scale hardness of 3.5 or less was 1.0:9.0) | |

Example 3

An electrostatic recording material was produced in the same manner as in Example 1 except that the solution used for forming the dielectric layer had the following composition:

<Composition for dielectric layer>

| | |
|---|---:|
| Butyral resin | 30.0 parts |
| (DENKA BUTYRAL #2000, Denki Kagaku Kogyo K.K.) | |
| Silicon dioxide | 4.14 parts |
| (average diameter: 4 $\mu$m, SYLYSIA 435, a silica gel manufactured by Fuji Silysia Chemical Co., Ltd.) | |
| Aluminium hydroxide | 2.76 parts |
| (average diameter: 6 $\mu$m, HIGILITE H-31 Showa Keikinzoku Co., Ltd.) | |
| Methanol-denatured ethanol | 195.0 parts |
| n-Butanol | 75.0 parts |

-continued

<Composition for dielectric layer>

(ratio of silicon dioxide/pigment having a Mohs' scale hardness of 3.5 or less was 6.0:4.0)

Example 4

An electrostatic recording material was produced in the same manner as in Example 1 except that the solution used to form the dielectric layer had the following composition:

<Composition for dielectric layer>

| | |
|---|---|
| Butyral resin | 30.0 parts |
| (DENKA BUTYRAL #2000, Denki Kagaku Kogyo K.K.) | |
| Silicon dioxide | 1.50 parts |
| (average diameter: 4 μm, SYLYSIA 435, a silica gel manufactured by Fuji Silysia Kagaku Co., Ltd.) | |
| Talc | 3.00 parts |
| (average diameter: 5 to 6 μm, PK-50 Tsuchiya Kaoline IND., Ltd.) | |
| Methanol-denatured ethanol | 195.0 parts |
| n-Butanol | 75.0 parts |

(ratio of silicon dioxide/pigment having a Mohs' scale hardness of 3.5 or less was 3.3:6.7)

Comparative Example 1

An electrostatic recording material was produced in the same manner as in Example 1 except that no aluminium hydroxide was present and 4.50 parts of silicon dioxide were used (ratio of silicon dioxide/pigment having a Mohs' scale hardness of 3.5 or less was 10:0).

Comparative Example 2

An electrostatic recording material was produced in the same manner as in Example 1 except that 4.50 parts of aluminium hydroxide were used and no silicon dioxide was used (ratio of silicon dioxide/pigment having a Mohs' scale hardness of 3.5 or less was 0:10).

Using each of the electrostatic recording materials obtained in Examples 1 to 4 and Comparative Examples 1 and 2 and an electrostatic plotter (EP-101 MONOCHROME PLOTTER, Matsusita Graphic Communication System, Inc.), a Mix pattern was outputted three times in the self-test mode of the plotter and "recording density", "dropouts" and "flares" were evaluated with respect to the printed areas of each third pattern.

Recording density:

Reflection density of the printed solid areas of the mix pattern was determined by a densitometer (Macbeth TR-927).

Dropouts:

Number of dropouts in line areas of the Mix pattern (5 lines×5 lines)

Flares:

Number of generated flares in line areas of the Mix pattern (5 lines×5 lines).

The results of the evaluation were as shown in Table 1.

TABLE 1

| | Recording density | Dropouts | Flares |
|---|---|---|---|
| Example | | | |
| 1 | 1.18 | 0 | 10 |
| 2 | 1.12 | 0 | 35 |
| 3 | 1.14 | 8 | 5 |
| 4 | 1.16 | 1 | 10 |
| Comparative Example | | | |
| 1 | 1.17 | 80 | 2 |
| 2 | 0.95 | 2 | 160 |

The electrostatic recording material of Example 1, which had a ratio of silicon dioxide/pigment having a Mohs' scale hardness of 3.5 or less of 3.3:6.7, showed good results with respect to all of "recording density", "dropouts" and "flares". The electrostatic recording material of Example 2, which had a ratio of silicon dioxide/pigment having a Mohs' scale hardness of 3.5 or less of 1.0:9.0, showed slightly increased flares, but it showed less dropouts and improvement in recording density compared with Comparative Example 2 (the pigment having a Mohs' scale hardness of 3.5 or less alone was used). The electrostatic recording material of Example 3, which had a ratio of silicon dioxide/pigment having a Mohs' scale hardness of 3.5 or less of 6.0:4.0, showed a few omitted dots and flares, but was markedly superior to the products of Comparative Example 1 (silicon dioxide alone was used) and Comparative Example 2 (pigment having a Mohs' scale hardness of 3.5 or less alone was used). The electrostatic recording material of Example 4, which had the same ratio of silicon dioxide/pigment having a Mohs' scale hardness of 3.5 or less as that of Example 1, but wherein aluminium hydroxide was replaced with talc as the pigment having a Mohs' scale hardness of 3.5 or less, showed good results like Example 1.

The electrostatic recording material of Comparative Example 1, since it contained only silicon dioxide, showed an extremely greater number of dropouts, although it otherwise showed good recording density. Further, it tended to show increasing numbers of dropouts as printing was repeated. The electrostatic recording material of Comparative Example 2, since it contained only the pigment having a Mohs' scale hardness of 3.5 or less, showed low image density and an extremely greater number of flares. Further, it tended to show increasing numbers of flares as printing was repeated.

Because of the dielectric layer comprising silicon dioxide and a pigment having a Mohs' scale hardness of 3.5 or less, the electrostatic recording materials of the present invention not only simultaneously eliminate the conventional problems of "dropouts" and "flares", but also improve density of printed areas.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electrostatic recording material comprising:
   a support;
   an electrically conductive layer superimposed on said support;
   a dielectric layer containing an insulating resin and a pigment composition, said dielectric layer being superimposed on said electrically conductive layer, said pigment composition consisting of silica gel and a pigment component having a Mohs' scale hardness of 3.5 or less and selected from the group consisting of aluminum hydroxide, talc, calcium carbonate and magnesium hydroxide.

2. The electrostatic recording material of claim 1 wherein the weight ratio of said silica gel to said pigment component is within a range of 0.5:9.5 to 7.0:3.0.

3. The electrostatic recording material of claim 2 wherein the weight ratio of said silica gel to said pigment component is within a range of 1.0:9.0 to 4.0:6.0.

4. The electrostatic recording material of claim 1 wherein said electrically conductive layer contains a conductive agent selected from the group consisting of polyvinylbenzyltrimethyl ammonium chlorides, polyallyltrimethylammonium chlorides, styreneacrylate triethylammonium chlorides, polystyrenesulphonates, polyacrylates, polyvinyl phosphates and electroconductive fine powders composed of zinc oxide doped with antimony oxide, ammonium oxide or tin oxide, tin oxide doped with antimony oxide or ammonium oxide, and indium oxide doped with antimony oxide, ammonium oxide or tin oxide.

5. The electrostatic recording material of claim 1 wherein said conductive layer contains a synthetic resin selected from the group consisting of polyesters, polyvinyl chlorides, polyacrylic acid esters, polymethacrylic acid esters and polyamides.

6. The electrostatic recording material of claim 1 wherein the insulating resin of the dielectric layer is selected from the group consisting of homopolymers and copolymers of acrylic acid esters, homopolymers and copolymers of methacrylic acid esters, polyvinyl acetates, ethylene/polyvinyl acetate copolymers, butyral resins, polyesters, nitrocelluloses, polystyrenes, styrene/acrylic acid or acrylate copolymers, styrene/methacrylic acid or methacrylate copolymers and phenol resins.

7. The electrostatic recording material of claim 1 wherein the silica gel is in the form of particles having an average diameter within a range of about 1 to about 20 μm.

8. The electrostatic recording material of claim 7 wherein the silica gel is in the form of particles having an average diameter within a range of about 2 to about 8 μm.

9. The electrostatic recording material of claim 1 wherein the pigment component is in the form of particles having an average diameter within a range of about 1 to about 20 μm.

10. The electrostatic recording material of claim 9 wherein the pigment component is in the form of particles having an average diameter is within a range of about 2 to about 8 μm.

11. The electrostatic recording material of claim 1 wherein the total amount of the pigment composition contained in the dielectric layer is within a range of 3 to 40% by weight based on the weight of insulating resin contained in the dielectric layer.

12. The electrostatic recording material of claim 11 wherein the total amount of the pigment composition contained in the dielectric layer is within a range of 5 to 30% by weight based on the weight of the insulating resin.

13. The electrostatic recording material of claim 1 wherein said pigment component is aluminum hydroxide.

* * * * *